(No Model.)
B. ELMORE.
WRENCH.
No. 304,807. Patented Sept. 9, 1884.
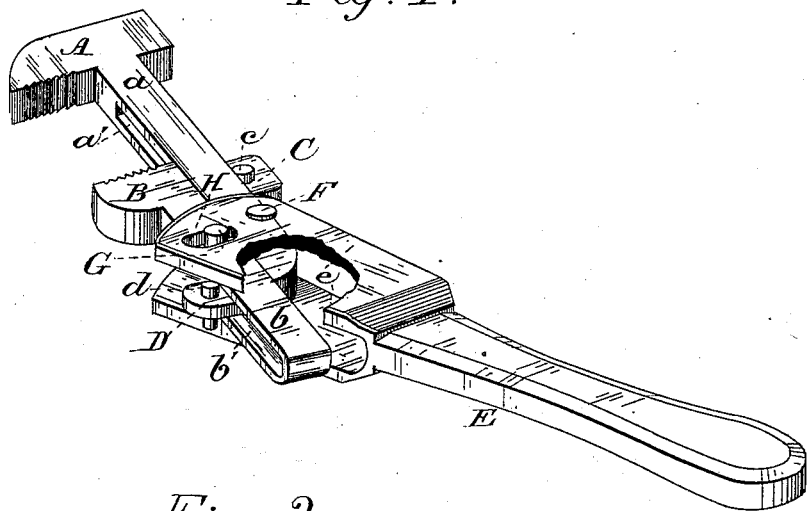
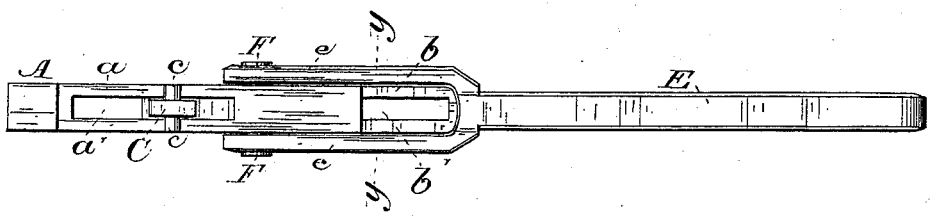
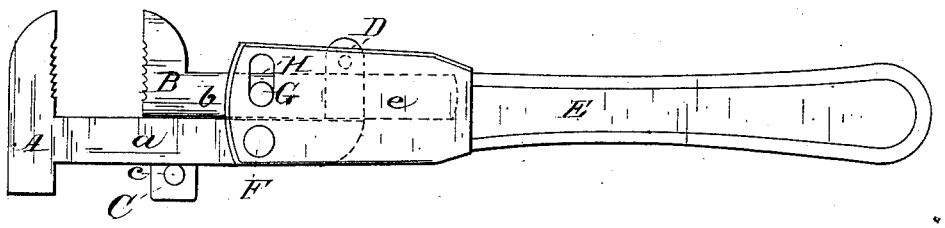
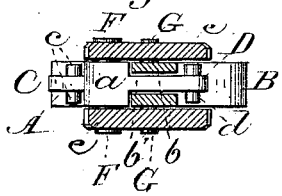
Witnesses,
Geo. H. Strong
J. T. Strouse
Inventor,
Benton Elmore
By Dewey & Co.
Attorneys

UNITED STATES PATENT OFFICE.

BENTON ELMORE, OF ETNA, CALIFORNIA.

WRENCH.

SPECIFICATION forming part of Letters Patent No. 304,807, dated September 9, 1884.

Application filed May 8, 1884. (No model.)

*To all whom it may concern:*

Be it known that I, BENTON ELMORE, of Etna, county of Siskiyou, and State of California, have invented an Improvement in Wrenches; and I hereby declare the following to be a full, clear, and exact description thereof.

My invention relates to that class of wrenches in which the approach and separation of the jaws are dependent upon the movement of the handle, and whose bite or grip is proportionate to the pressure brought upon the handle.

My invention consists in the arrangement and connection of the jaws with each other, and of both with the handle, which I shall hereinafter fully explain.

The object of my invention is to provide a simple, effective, and easily-operated wrench.

Referring to the accompanying drawings, Figure 1 is a perspective view of my wrench, a portion of the forked end being cut away in order to show the interior mechanism. Fig. 2 is a longitudinal elevation of the rear part. Fig. 3 is a plan. Fig. 4 is a transverse vertical section on the line $y\ y$, Fig. 2.

A is the outer jaw, having shank $a$.

B is the inner jaw, having shank $b$. In the shank $a$ is made an elongated slot, $a'$, and in the shank $b$ is made an elongated slot, $b'$. From the back of the top of shank $b$ extends an arm, C, which passes loosely through slot $a'$, and is prevented from coming out by a cross-pin, $c$, through its end. From the face of the bottom of shank $a$ extends an arm, D, which passes loosely through the slot $b'$, and is prevented from coming out by a cross-pin, $d$, as shown.

E is the handle, having a forked end, $e$. The shanks of both jaws fit into the forked end of the handle. The shank $a$ is pivoted therein by a bolt or rivet, F, passing through the forked end near its upper corner, and through the shank at a point about midway between the two arms C D. The shank $b$ is pivoted therein by means of a pin or bolt, G, extending oppositely from the shank, and passing through elongated slots H, made in the sides of the forked end of the handle, near their lower corner, and at right angles with the length of the handle. The movement of the handle on the fixed pivot-connection between it and the shank $a$ forces or draws the shank $b$ forward and back on the shank $a$, this movement of shank $b$ taking place in a plane parallel with shank $a$ by means of the loose pivot-connection between shank $b$ and the handle and the sliding connection between the two shanks formed by the arms C D and the slots $a'\ b'$ in the respective shanks. This movement of the inner jaw renders the bite or grip of the wrench proportionate to the pressure brought to bear upon the handle—that is to say, that the more pressure brought upon the handle the harder the jaws bite. By reason of this fact, and by the addition of a corrugated face to each jaw, as shown, the wrench will take hold of round iron and may be used for a pipe-wrench.

Having thus described my invention, what I claim as new, and desire to secure by Letters Patent, is—

1. In a wrench, the outer jaw, A, having shank $a$, with elongated slot $a'$ made therein, the inner jaw, B, having shank $b$, with elongated slot $b'$ made therein, the arm D on shank $a$, guided and held in slot $b'$, and the arm C on shank $b$, guided and held in slot $a'$, in combination with a handle, a fixed pivot-connection between said handle and shank $a$, and a moving pivot-connection between said handle and shank $b$, whereby the approach and separation of the jaws are dependent upon the movement of the handle, substantially as herein described.

2. In a wrench, the outer jaw, A, having shank $a$, with elongated slot $a'$ made therein, the inner jaw, B, having shank $b$, with elongated slot $b'$ made therein, the arm D on shank $a$, guided and held in slot $b'$, and the arm C on shank $b$, guided and held in slot $a'$, in combination with the handle E, having a forked end, $e$, in which the ends of shanks $a\ b$ fit, the fixed pivot-bolt or rivet F, passing through one corner of end $e$ and through shank $a$, and the pivot pin or bolt G, extending from shank $b$ and playing in elongated slots H, made in the other corner of the end $e$, and at right angles with the length of the handle, substantially as herein described.

In witness whereof I have hereunto set my hand.

BENTON ELMORE.

Witnesses:
S. FARRINGTON,
HANS PEDERSEN.